(12) United States Patent
Liu et al.

(10) Patent No.: US 9,674,820 B2
(45) Date of Patent: Jun. 6, 2017

(54) ADAPTIVE BEACON TRANSMISSION

(71) Applicant: Telefonaktiebolaget L M Ericsson (publ), Stockholm (SE)

(72) Inventors: Jinhua Liu, Beijing (CN); Qingyu Miao, Beijing (CN)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 80 days.

(21) Appl. No.: 14/422,162

(22) PCT Filed: Jun. 13, 2014

(86) PCT No.: PCT/CN2014/079843
§ 371 (c)(1),
(2) Date: Feb. 17, 2015

(87) PCT Pub. No.: WO2015/188374
PCT Pub. Date: Dec. 17, 2015

(65) Prior Publication Data
US 2016/0262140 A1   Sep. 8, 2016

(51) Int. Cl.
*H04W 4/00* (2009.01)
*H04W 72/04* (2009.01)
*H04W 16/28* (2009.01)

(52) U.S. Cl.
CPC ....... *H04W 72/0406* (2013.01); *H04W 16/28* (2013.01); *H04W 72/0453* (2013.01)

(58) Field of Classification Search
CPC ..... H04W 48/10; H04W 76/00; H04W 72/04; H04W 88/08; H04W 88/02; H04W 72/1226; H04W 72/085
See application file for complete search history.

(56) References Cited

U.S. PATENT DOCUMENTS

2014/0161051 A1   6/2014   D'Angelo et al.

FOREIGN PATENT DOCUMENTS

| CN | 101969327 A | 2/2011 |
|----|-------------|--------|
| CN | 102378205 A | 3/2012 |
| CN | 103733542 A | 4/2014 |

OTHER PUBLICATIONS

International Search Report and the Written Opinion for International Application No. PCT/CN2014/079843, mailed Mar. 16, 2015, 12 pages.
International Preliminary Report on Patentability for Application No. PCT/CN2014/079843, mailed Dec. 15, 2016, 5 pages.

*Primary Examiner* — Thai Nguyen
*Assistant Examiner* — Phong La
(74) *Attorney, Agent, or Firm* — Nicholson De Vos Webster & Elliott LLP

(57) ABSTRACT

The embodiments disclose a method in AP for adaptive beacon transmission. The AP transmits a beacon signal through a plurality of beacon beams to an area. The plurality of beacon beams are grouped into a plurality of beacon beam sets. The method comprises obtaining a first statistical information, within a first period, based on times each of beacon beams in a first beacon beam set is identified, by any one of the at least one communication device within the area, to carry the beacon signal with the best reception quality among its received beacon signals, and adapting a frequency to transmit the beacon signal over each of the beacon beams in the first beacon beam set based on the first statistical information.

14 Claims, 6 Drawing Sheets obtaining a first statistical information, within a first period, on times each of beacon beams in a first beacon beam set is identified, by any one of at least one communication device within an area served by the AP, to carry a beacon signal with the best reception quality among its received beacon signals ~ 310 adapting a frequency to transmit a beacon signal over each of the beacon beams in the first beacon beam set based on the first statistical information ~ 320

Fig. 3

ADAPTIVE BEACON TRANSMISSION

CROSS-REFERENCE TO RELATED APPLICATIONS

This application is a National stage of International Application No. PCT/CN2014/079843, filed Jun. 13, 2014, which is hereby incorporated by reference.

TECHNICAL FIELD

The present technology relates to the field of radio communication, particularly to beacon transmission. The technology also relates to an access point (AP) and a computer readable storage medium for performing the method.

BACKGROUND

An Ultra Dense Network (UDN) is typically deployed in highly populated areas such as hot spots, office building, or downtown area at cities, where there are demands of high data rate service. Currently, data traffic is boosting rapidly while there is a clear bandwidth limit in low frequency bands. Hence, it is necessary for UDN to utilize a higher carrier frequency and a wider bandwidth in order to reach an even higher data rate. Accordingly, the UDN is supposed to operate over higher frequency, such as Millimeter-wave (mmW) frequencies ranged from 30 GHz to 300 GHz.

However, at such high transmission frequency, the path loss becomes much higher than that at low transmission frequency. For example, the attenuation for a carrier at tens of GHz ($f_{high}$) is about $(f_{high}/f_{low})^2$ times larger than the attenuation for a carrier at several GHz ($f_{low}$).

A beacon signal transmitted by an access point (AP) in the UDN can play as synchronization signal, one or multiple preambles for control or data signal detection, beam training preamble, etc, or any combination thereof. For example, by means of the synchronization signal, a user equipment (UE) can detect an AP, synchronize to the AP and receive the control signal so as to access the AP when necessary.

Since the beacon signals play such an important role in the network, all the APs in the network have to transmit them such that the UEs can detect the best AP and request service when necessary, which results in a large overhead for the APs in the network.

In practice, it is a basic policy that the coverage of control channel transmitting the beacon signals shall be larger than or equal to the data channel coverage. In order to overcome the large attenuation in the UDN such that the beacon transmission can meet the desired coverage, the UDN may employ the high gain beamforming antennas. Typically, the beacon signal will be broadcasted by way of beacon sweeping which means that the AP transmits a same beacon signal over a plurality of beams directed to different directions one after another. Here, the beam utilized to transmit the beacon signal is referred to as the beacon beam. As illustrated in FIG. 1, the narrower the beacon beams, the more beacon beams are needed to cover the desired area. In order to ensure best coverage by an AP, a fixed maximum number (N) of beacon beams may be configured by default. Generally, the beacon sweeping is performed periodically. As illustrated in FIG. 2, in each beacon transmission (TX) cycle, all the beams (beam1-beamN) of the AP will be utilized to transmit the beacon signal in the corresponding time slots. Since all the beams are frequently used to transmit the beacon signal, lots of time-frequency resources, which otherwise can be used to transmit the payload data, are occupied by beacon transmission. Such frequent beacon transmission also accounts for the increased antenna power consumption. Furthermore, another disadvantage is that, frequent beacon signal transmission also means frequent emitted interference. From this perspective, it is meaningful to identify the conditions under which transmissions of beacon signals can be reduced.

SUMMARY

It's an object of the present invention to resolve or alleviate at least one of the problems mentioned above.

A first aspect of the present disclosure is a method in AP for adaptive beacon transmission. The AP transmits a beacon signal through a plurality of beacon beams in an area served by the AP. The plurality of beacon beams are grouped into a plurality of beacon beam sets. The method comprises obtaining a first statistical information, within a first period, on times each of beacon beams in a first beacon beam set is identified, by any one of at least one communication device within the area, to carry a beacon signal with the best reception quality among its received beacon signals, and adapting a frequency to transmit a beacon signal over each of the beacon beams in the first beacon beam set based on the first statistical information.

A second aspect of the present disclosure is a computer readable storage medium storing instructions. When run on an access point, the instructions cause the AP to perform the steps of the method as described above.

A third aspect of the present disclosure is an AP configured to adapt beacon transmission. The AP is configured to transmit a beacon signal through a plurality of beacon beams in an area served by the AP. The plurality of beacon beams is grouped into a plurality of beacon beam sets. The AP comprises a first obtaining unit and a first adapting unit. The first obtaining unit is configured to obtain a first statistical information, within a first period, on times each of beacon beams in a first beacon beam set is identified, by any one of the at least one communication device within the area, to carry a beacon signal with the best reception quality among its received beacon signals. The first adapting unit is configured to adapt a frequency to transmit a beacon signal over each of the beacon beams in the first beacon beam set based on the first statistical information.

A fourth aspect of the present disclosure is an AP configured to adapt beacon transmission. The AP is configured to transmit a beacon signal through a plurality of beacon beams to an area. The plurality of beacon beams is grouped into a plurality of beacon beam sets. The AP comprises a processor and a memory. The memory contains instructions executable by the processor whereby the AP is operative to obtain a first statistical information, within a first period, on times each of beacon beams in a first beacon beam set is identified, by any one of the at least one communication device within the area, to carry a beacon signal with the best reception quality among its received beacon signals; and adapt a frequency to transmit a beacon signal over each of the beacon beams in the first beacon beam set based on the first statistical information.

Although use of a higher frequency to transmit beacon signals may ensure a communication device to detect and access a desirable AP quicker, there should be a trade-off between impact on the user experience and the impact on the network performance due to the frequent beacon transmission. By means of adaptively adjusting the frequency to transmit the beacon signal over the respective beacon beams, an optimized beacon beam transmission pattern can be determined to significantly reduce the time-frequency resource consumption on the beacon transmission and interference due to beacon transmission without sacrificing the user experience too much.

BRIEF DESCRIPTION OF THE DRAWINGS

The technology will be described below, by way of example, based on embodiments with reference to the accompanying drawings, wherein:

FIG. 3 schematically illustrates a flowchart of adapting beacon transmission in accordance with an embodiment;

DETAILED DESCRIPTION

Figure 1:
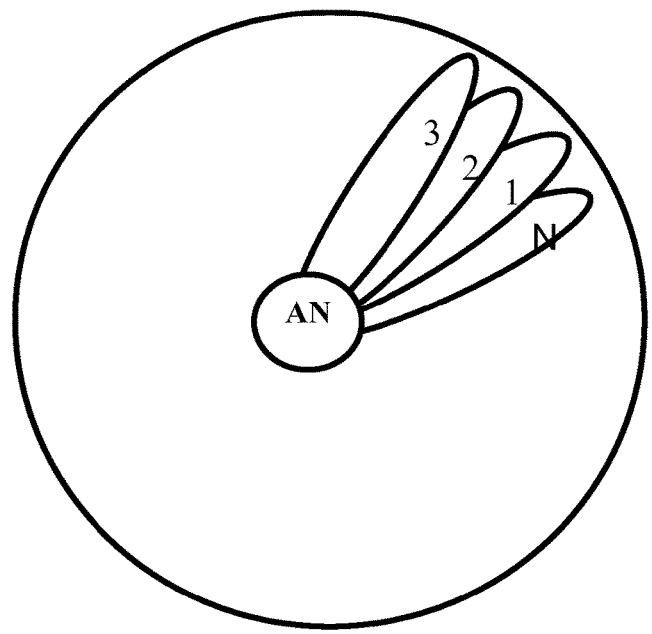
FIG. 1 illustrates an example of beacon sweeping of an AP which is expected to cover a circle area with N partially overlapped beacon beams.
Figure 2:
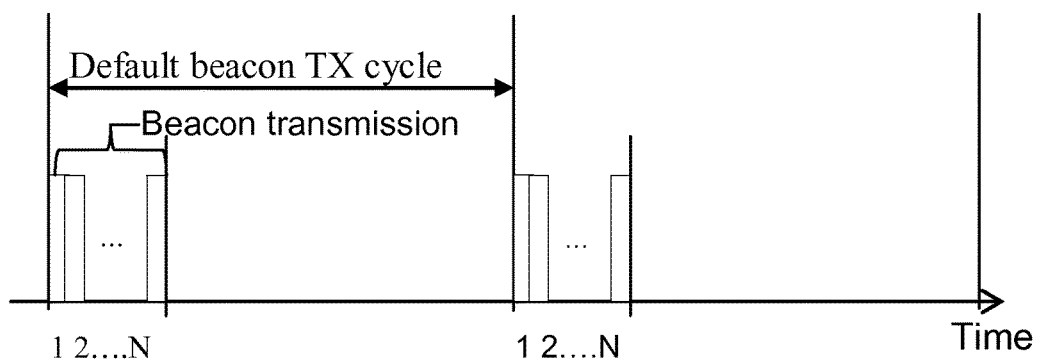
FIG. 2 illustrates an example of periodical beacon transmission in the prior art.

Embodiments herein will be described hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Although specific terms in some specifications are used here, such as AP, it should be understand that the embodiments are not limited to those specific terms but may be applied to all similar entities, such as base station, cell, sector, femto base station, NodeB, Evolved NodeB (eNodeB) etc.

By way of example, the embodiments herein will be discussed in the context of the mmW network. It should be appreciated that the embodiments are applicable to all radio networks that involve the transmission of the beacon signal over beacon beams via beacon sweeping.

Embodiments herein will be described below with reference to the drawings.

FIG. 3 schematically illustrates a flowchart of adapting beacon transmission by an AP in accordance with an embodiment. The AP may employ, for example, high gain beamforming technology to transmit a beacon signal through a plurality of beacon beams in an area served by the AP. One or more communication device may be located in this area and receive the beacon signal through one or more of the beacon beams. Typically, the AP may have multiple beamforming antennas, which are used to generate a beam directed to a determined direction. In addition, it is also possible that one beamforming antenna can generate several beams simultaneously directed to different directions. Since these beacon beams propagate in different directions around the AP, a communication device may not necessarily be able to detect all the beacon beams transmitted by the AP, but it can be determined that the communication device is covered by the AP as long as at least one beacon beam from the AP is detected by the communication device.

Here, the communication device may be any device intended for requesting services via a radio communication network and configured to communicate over the radio communication network. For instance, the communication device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or personal computer (PC). The communication device may be a portable, pocket-storable, hand-held, computer-comprised, or vehicle-mounted mobile device, enabled to communicate voice and/or data, via a wireless connection. In some cases, the communication device can be another AP, for example, the relay AP.

In the embodiment, all the beacon beams of the AP are grouped into a plurality of beacon beam sets. Each beam set may have one or more beacon beams. Now the process of the embodiment will be described in detail with reference to FIG. 3.

In block 310, the AP obtains a first statistical information, within a first period, on times each of beacon beams in a first beacon beam set is identified, by any one of at least one communication device within the area served by the AP, to carry a beacon signal with the best reception quality among its received beacon signals.

Specifically, the first period may span one or more beacon transmission cycles, thus each of the beacon beams of the AP will be utilized to transmit beacon signals for one or more times during the first period. A plurality of communication devices may be located within the AP's beacon transmission coverage. As such, the individual commutation devices may detect one or more beacon beams transmitted from the AP, and receive the beacon signals from the beacon beams. After receiving the beacon signals, a communication device may determine the reception quality of its received beacon signals, for example, by measuring the strength of the beacon signals, Signal to Interference and Noise Ratio (SINR) or the Signal to Noise Ratio (SNR) of the beacon signals, and then compare the reception quality of the received beacon signals to determine the beacon signal with the best reception quality. In this way, a communication device that needs to communicate with the AP can identify the corresponding beacon beam that carries the beacon signal with the best reception quality. Upon identifying the beacon beam carrying the beacon signal with the best reception quality, the communication device may report the identification to the AP. By collecting such identifications from these communication devices, the AP may count the times a beacon beam is identified to carry the beacon signal with the best reception quality within the first period, for each of the beacon beams in the first beacon beam set. Herein, the beacon beam that is identified by a specific communication device to carry the beacon signal with the best reception quality is hereinafter referred to as the best beacon beam to simplify the description. For example, the AP have N (N>1) beacon beams, beam1-beamN. The beam1 and beam2 belong to the first beacon beam set. During the first period, the beam 1 is identified by the communication device D1 as the best beacon beam twice and identified by the communication device D2 as the best beacon beam thrice. The beam 2 is identified by the communication device D1 as the best beacon beam once and identified by the communication device D2 as the best beacon beam once. As such, the AP may determine that the total times that each beam of the first beacon beam set is identified as the best beacon beam is 7 times.

It should be appreciated that the above obtaining the first statistical information is described by way of example, and other suitable ways of obtaining the first statistical information can be applied to the present disclosure.

In block 320, the AP adapts a frequency to transmit a beacon signal over each of the beacon beams in the first beacon beam set based on the first statistical information.

Generally, when a beacon beam is identified as the best beacon beam by a communication device, the communication device will establish communication connection with the AP by means of the beacon signal carried by this beacon beam so as to request service from the AP. Thus, when the beacon beams in a beacon beam set is frequently identified as the best beacon beam by individual communication devices within in the first period, it means that there are more service demands from the communication devices in the area covered by this beacon beam set. In other words, now this area is a "hot" area having larger communication traffic between the AP and the communication devices. In this case, it is desirable for the AP to keep transmitting the beacon signal over this beacon beam set in a higher frequency such that the communication devices can establish the communication connection with the AP as soon as possible.

In an embodiment, a default beacon transmission frequency (e.g. once every 4 time units) can be predefined for all beacon beam sets at beginning. When it is determined that the area covered by a beacon beam set is a "hot" area, the AP may increase the frequency for the beacon beams within the beacon beam set (e.g. once every 1 time unit) which is utilized to cover the "hot" area.

On the other hand, if the beacon beams in a beacon beam set are seldom identified as the best beacon beam by individual communication devices, it means that this beacon beam is needed by fewer communication devices. That is to say, the area covered by the beacon beam set is a "cold" area with little communication traffic there, for example, this area is a house corner or empty square at night. In this case, the AP may decrease the frequency to transmit a beacon signal over this beacon beam set so as to save the overhead for beacon transmission, meanwhile its impact on the user experience is acceptable, since very occasionally a communication device may be in need of this beacon beam.

Figure 5:
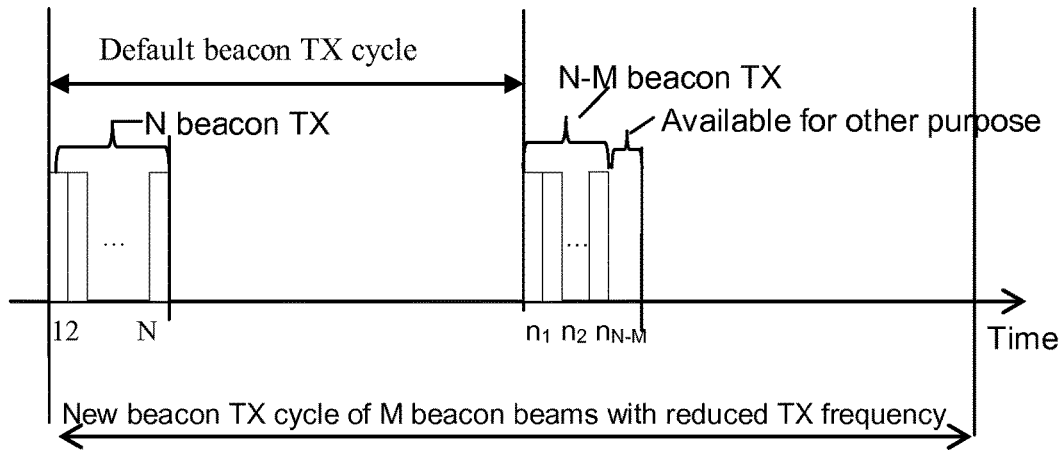
FIG. 5 illustrates an example of periodical beacon transmission in accordance with an embodiment.

In an embodiment, as illustrated in FIG. 5, a default beacon transmission cycle (e.g. equal to 4 time units) is set for all beacon beams at the beginning. Among the N beacon beams, M (M<N) beacon beams belong to a beacon beam set. If it is determined that the area covered by the beacon beam set is a "cold" area, the AP may decrease the frequency for the M beacon beams within the beacon beam set from once every 4 time units to once every 8 time units i.e. a new beacon transmission cycle for the M beacon beams. In this way, some time-frequency resources can be released from the beacon transmission in the second beacon transmission cycle, such that these resources can be used for other purposes such as payload data transmission.

It should be appreciated that the AP can repeatedly perform the process above to, for example, periodically adapt the frequency to transmit beacon signals over the respective beacon beam sets based on the obtained first statistical information. The process to adapt a frequency to transmit a beacon signal over each of the beacon beams in the first beacon beam set based on the first statistical information will be further described in detail later.

As indicated, by means of adaptively adjusting the frequency to transmit the beacon signal over the respective beacon beam sets, an optimized beacon beam transmission pattern can be determined to clearly reduce the time-frequency resource consumption on the beacon transmission and interference of beacon transmission without unacceptably sacrificing the user experience.

Optionally, the spatially neighboring beacon beams are desirably grouped into the same beacon beam set. It is often that there is overlapped area between the spatially neighboring beacon beams, hence the areas covered by the neighboring beacon beams intend to present the similar hotness tendency, such as towards "hot" or towards "cold".

In this sense, the beacon beams in the same beacon beam set can be consistently adapted (increased/decreased) with respect to the frequency to transmit beacon signals. For example, the beam1 and beam2, as illustrated in FIG. 1, are grouped into the first beacon beam set. The AP may determine the hotness of the areas covered by the beam1 and beam2 based on the statistical information on the sum times either beam 1 or beam2 is identified as the best beacon beam within the first period, and then consistently adapt the frequency to transmit beacon signals over beam1 and beam2. For example, the frequencies for both of them are consistently decreased.

Now the process to adapt a frequency to transmit a beacon signal over each of the beacon beams in the first beacon beam set based on the first statistical information will be further set forth by illustrating the following embodiments.

Embodiment I

Firstly, the AP may calculate a first value to be a sum of the times each of the beacon beams in the first beacon beam set is identified to carry a beacon signal with the best reception quality within the first period, based on the first statistical information. The first value can be expressed as $\sum_{j=1}^{J} X_{k,j}$, $X_{k,j}$ is the accumulated number of times that the j-th beacon beam within the beacon beam set k is identified as the best beacon beam within the first period, J is the number of beacon beams in the beacon beam set k. Subsequently, the AP may calculate a first ratio which is a ratio of the first value to a sum of times each of the beacon beams in the first beacon beam set is utilized to transmit a beacon signal within the first period. The first ratio can be expressed as $F_k$ below:

$$F_k = \frac{\sum_{j=1}^{J} X_{k,j}}{\sum_{j=1}^{J} Q_{k,j}} \times 100\%, \quad \text{Equation 1}$$

wherein $Q_{k,j}$ is the accumulated number of times that the j-th beacon beam within the beacon beam set k is utilized to transmit beacon signals within the first period.

Finally, the AP may adapt the frequency to transmit a beacon signal over each of the beacon beams in the first beacon beam set based on the first ratio. For example, if the first ratio is less than a first threshold, then the AP may decrease the frequency to transmit a beacon signal over each of the beacon beams in the first beacon beam set. Alternatively, it is possible to predefine several thresholds, and the AP may compare the first ratio with the several thresholds to determine the corresponding target frequency for beacon transmission.

TABLE 1

| Index | Beacon TX frequency | The first ratio threshold |
| --- | --- | --- |
| 1 | $F_{beaxon,low}$ | $F_k < F_{thres,low}$ |
| 2 | $F_{beaxon,med}$ | $F_{thres,low} \leq F_k \leq F_{thres,high}$ |
| 3 | $F_{beaxon,high}$ | $F_k > F_{thres,high}$ |

As shown in the table 1, two thresholds, $F_{thres,low}$ and $F_{thres,high}$ are predefined, wherein $T_{thres,low} < F_{thres,high}$. Accordingly, there are three recommended frequencies for beacon transmission $F_{beaxon,low}$, $F_{beaxon,med}$ and $F_{beaxon,high}$, wherein $F_{beaxon,low} < F_{beaxon,med} < F_{beaxon,high}$. For example, If the first ratio $F_k$ is less than $F_{thres,low}$ it means that the areas covered by the beacon beams of the first beacon beam set is "cold", hence the AP will adapt the frequencies for beacon transmission with respect to the beacon beams of the first beacon beam set to a low frequency $F_{beaxon,low}$.

Embodiment II

Firstly, the AP may calculate a first value to be a sum of the times each of the beacon beams in the first beacon beam set is identified to carry a beacon signal with the best reception quality within the first period in the same way as that in Embodiment I, which will not be repeated for brevity.

Then, the AP may calculate a second ratio which is a ratio of the first value to a sum of times each of all the beacon beams of the AP is identified, by any one of the communication devices within the AP's coverage, to carry a beacon signal with the best reception quality among its received beacon signals within the first period. The second ratio can be expressed as $R_k$ below:

$$R_k = \frac{\sum_{j=1}^{J} X_{k,j}}{\sum_{n=1}^{N} X_n} \times 100\%, \quad \text{Equation 2}$$

wherein N is the total number of the beacon beams of the AP which include the J beacon beams in the beacon beam set k, $N \geq J$, $X_n$ is the accumulated number of times that the n-th beacon beam of the AP is identified to carry a beacon signal with the best reception quality within the first period.

Finally, the AP may adapt the frequency to transmit a beacon signal over each of the beacon beams in the first beacon beam set based on the second ratio. For example, if the second ratio is less than a second threshold, then the AP may decrease the frequency to transmit a beacon signal over each of the beacon beams in the first beacon beam set. Likewise, in this embodiment, it is also possible to predefine several thresholds, and the AP may compare the second ratio with the several thresholds to determine the corresponding target frequency for beacon transmission.

TABLE 2

| Index | Beacon TX frequency | The second ratio threshold |
| --- | --- | --- |
| 1 | $F_{beaxon,low}$ | $R_k < R_{thres,low}$ |
| 2 | $F_{beaxon,med}$ | $R_{thres,low} \leq R_k \leq R_{thres,high}$ |
| 3 | $F_{beaxon,high}$ | $R_k > R_{thres,high}$ |

As shown in the table 2, two thresholds, $R_{thres,low}$ and $R_{thres,high}$ are predefined, wherein $R_{thres,low} < R_{thres,high}$. Accordingly, there are three recommended frequencies for beacon transmission $F_{beaxon,low}$, $F_{beaxon,med}$ and $F_{beaxon,high}$ wherein $F_{beaxon,low} < F_{beaxon,med} < F_{beaxon,high}$. For example, if the first ratio $R_k$ is larger than $R_{thres,high}$ it means that the areas covered by the beacon beams of the first beacon beam set is "hot", hence the AP will adapt the frequencies for beacon transmission with respect to the beacon beams of the first beacon beam set to a high frequency $F_{beaxon,high}$.

Note that the first ratio and the second ratio also can be used in combination to adapt the frequency to transmit a beacon signal over each of the beacon beams in the first beacon beam set. For example, the frequency will be adapted to $F_{beaxon,high}$ only when the first ratio $F_k$ is larger than $F_{thres,high}$ and the second ratio $R_k$ is larger than $R_{thres,high}$.

Figure 4:
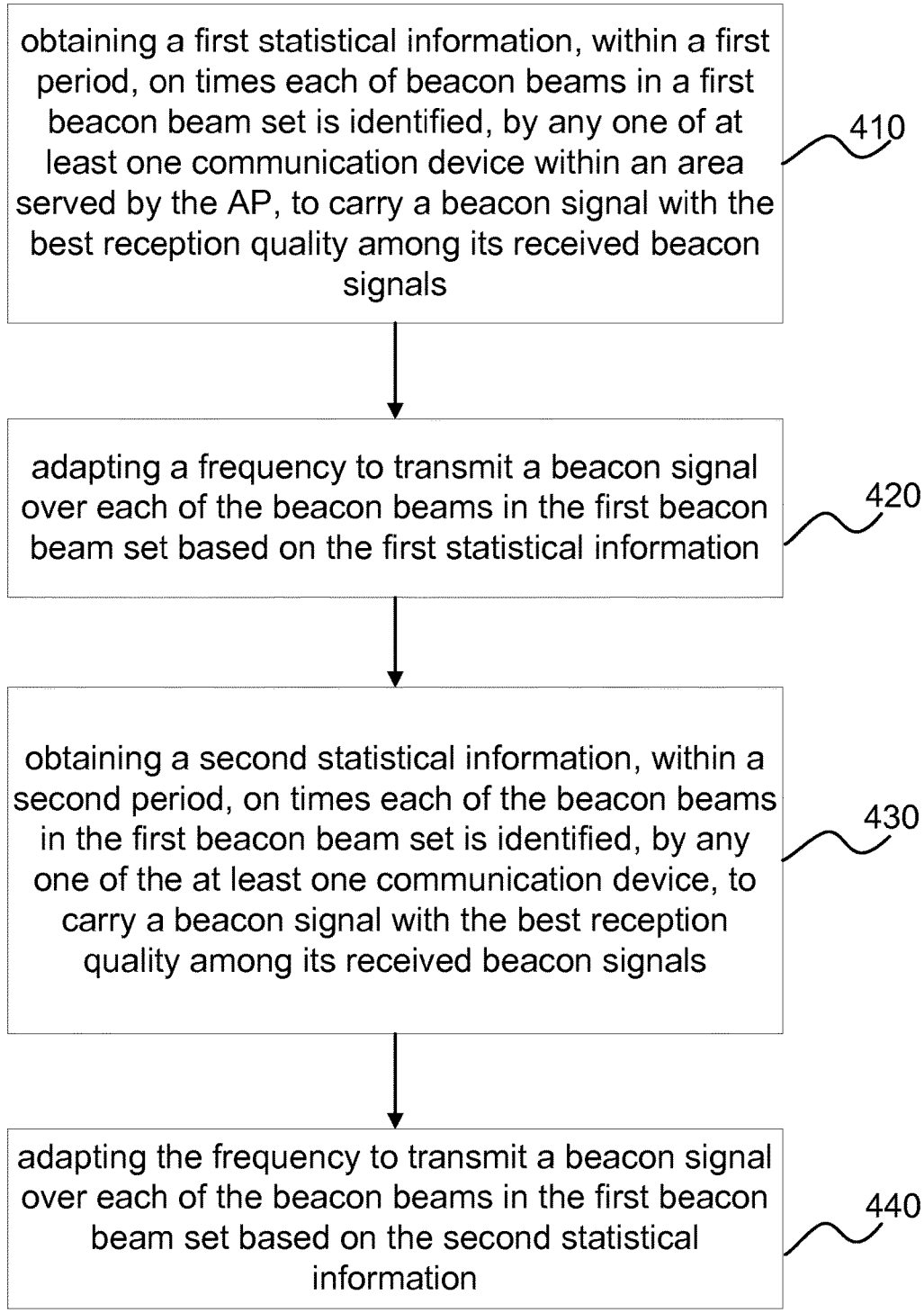
FIG. 4 schematically illustrates a flowchart of adapting beacon transmission in accordance with an embodiment.

FIG. 4 schematically illustrates a flowchart of adapting beacon transmission in accordance with another embodiment.

In block 410, the AP obtains a first statistical information, within a first period, on times each of beacon beams in a first beacon beam set is identified as the best beacon beam. In block 420, the AP adapts frequency to transmit a beacon signal over each of the beacon beams in the first beacon beam set based on the first statistical information. Here, the process in blocks 410 and 420 is performed in the similar way as that in blocks 310 and 320 in FIG. 3, and hence will not be repeated for brevity.

In block 430, the AP may obtain a second statistical information, within a second period, on times each of the beacon beams in the first beacon beam set is identified as the best beacon beam. In block 440, the AP may adapt the frequency to transmit a beacon signal over each of the beacon beams in the first beacon beam set based on the second statistical information.

In an embodiment, the process in blocks 410 and 420 and the process in blocks 430 and 440 may be independently performed to respectively decrease and increase frequency to transmit a beacon signal over each of the beacon beams in the first beacon beam set. For example, the process in blocks 410 and 420 can be performed to increase the frequency for beacon transmission, whereas the process in blocks 430 and 440 can be performed to decrease the frequency for beacon transmission. In this particular example, the first period may be longer than the second period. As such, the process of decreasing the frequency for beacon transmission will experience a longer statistical period than the process of increasing the frequency for beacon transmission. In this way, the AP will be given more opportunities to increase the frequency with respect to a beacon beam than decreasing the frequency. In other words, the process of increasing the frequency for beacon transmission may make quicker response to the hotness in the coverage of the AP. For example, when additional communication devices move into or are activated in an area, the process of increasing the frequency for beacon transmission will timely increase the frequency to transmit beacon signals over the beacon beam set directed to this area. Therefore, the communication devices can access the AP more quickly.

It will be appreciated that the present invention is not limited in this regard. For example, the process in blocks 410 and 420 can be utilized to decrease the frequency for beacon transmission, whereas the process in blocks 430 and 440 can be utilized to increase the frequency for beacon transmission.

In an embodiment, the AP may calculate a first value to be a sum of the times each of the beacon beams in the first beacon beam set is identified as the best beacon beam based on the first statistical information within the first period and then calculate a first ratio which is a ratio of the first value to a sum of times each of the beacon beams in the first beacon beam set is utilized to transmit a beacon signal within the first period. The first ratio can be calculated by the equation 1 described above and may be used to adapt the frequency for beacon transmission. For example, if the first ratio is less than the first threshold, the AP can decrease the frequency to transmit beacon signals over each of the beacon beams in the first beacon beam set.

Further, the AP may calculate a second value to be a sum of the times each of the beacon beams in the first beacon beam set is identified as the best beacon beam based on the second statistical information within the second period and then calculate a third ratio which is a ratio of the second value to a sum of times each of the beacon beams in the first beacon beam set is utilized to transmit a beacon signal within the second period. The third ratio can be calculated by the equation 1 described above and used to adapt the frequency for beacon transmission. For example, if the third ratio is greater than a third threshold, the AP will increase the frequency to transmit beacon signals over each of the beacon beams in the first beacon beam set.

Here, in order that the frequency for beacon transmission can be more easily to be increased than decreased to minimize the negative impact on the user experience, the first threshold is set larger than the third threshold.

In another embodiment, the AP may calculate a first value to be a sum of the times each of the beacon beams in the first beacon beam set is identified as the best beacon beam based on the first statistical information within the first period and then calculate a second ratio which is a ratio of the first value to a sum of times each of all the beacon beams of the AP is identified, by any one of the communication devices within the AP's coverage, as the best beacon beam within the first period. The second ratio can be calculated by the equation 2 described above and used to adapt the frequency for beacon transmission. For example, if the second ratio is less than the second threshold, the AP can decrease the frequency to transmit beacon signals over each of the beacon beams in the first beacon beam set Further, the AP may calculate a second value to be a sum of the times each of the beacon beams in the first beacon beam set is identified as the best beacon beam based on the second statistical information within the second period and then calculate a fourth ratio which is a ratio of the second value to a sum of times each of all the beacon beams of the AP is identified, by any one of the communication devices within the AP's coverage, as the best beacon beam within the second period. The fourth ratio can be calculated by the equation 2 described above and used to adapt the frequency for beacon transmission. For example, if the fourth ratio is greater than a fourth threshold, the AP will increase the frequency to transmit beacon signals over each of the beacon beams in the first beacon beam set.

Here, in order that the frequency for beacon transmission can be more easily to be increased than decreased to minimize the negative impact on the user experience, the second threshold is set larger than the fourth threshold.

Figure 6:
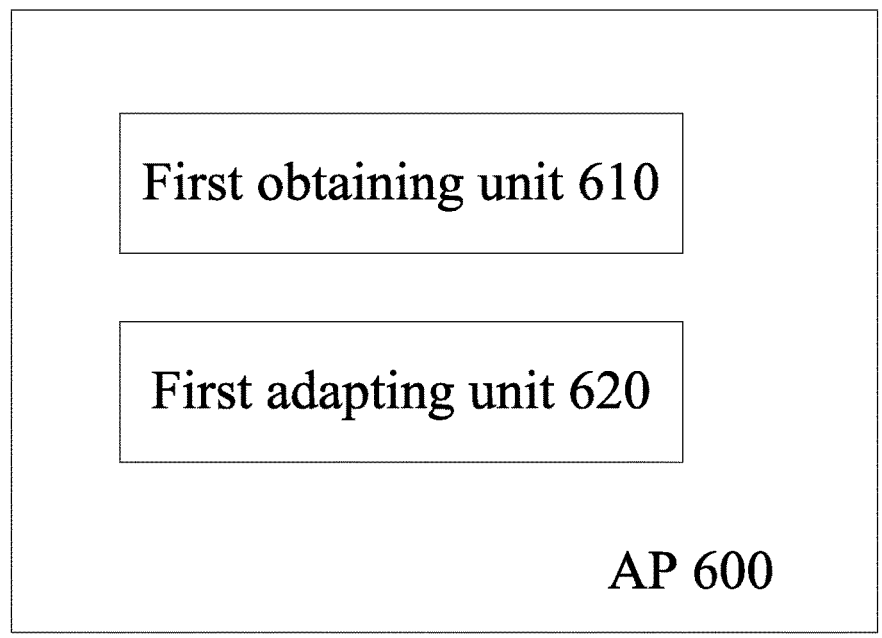
FIG. 6 schematically illustrates a block diagram of an AP configured to adapt beacon transmission in accordance with an embodiment.

FIG. 6 schematically illustrates a block diagram of an AP 600 configured to adapt beacon transmission in accordance with an embodiment. The AP 600 may employ, for example, high gain beamforming technology to transmit a beacon signal through a plurality of beacon beams in an area served by the AP 600. Since these beacon beams propagate in different directions around the AP 600, a communication device may not necessarily be able to detect all the beacon beams transmitted from the AP 600, but it can be determined that the communication device is covered by the AP as long as at least one beacon beam from the AP is detected by the communication device. In the embodiment, all the beacon beams of the AP 600 are grouped into a plurality of beacon beam sets. Each beam set may have one or more beacon beams.

As illustrated in FIG. 6, the AP 600 comprises a first obtaining unit 610 and a first adapting unit 620. It should be appreciated that the AP 600 is not limited to the shown elements, and can comprise other conventional elements and the additional elements for other purposes. Now the function of the shown elements will be described in detail with reference to FIG. 6.

The first obtaining unit 610 of the AP 600 is configured to obtain a first statistical information, within a first period, on times each of beacon beams in a first beacon beam set is identified, by any one of at least one communication device within the area served by the AP, to carry a beacon signal with the best reception quality among its received beacon signals. The first adapting unit 620 of the AP 600 is configured to adapt a frequency to transmit a beacon signal over each of the beacon beams in the first beacon beam set based on the first statistical information.

By means of adaptively adjusting the frequency to transmit the beacon signal over the respective beacon beam sets, an optimized beacon beam transmission pattern can be determined to clearly reduce the time-frequency resource consumption on the beacon transmission and interference of beacon transmission without unacceptably sacrificing the user experience.

Figure 7:
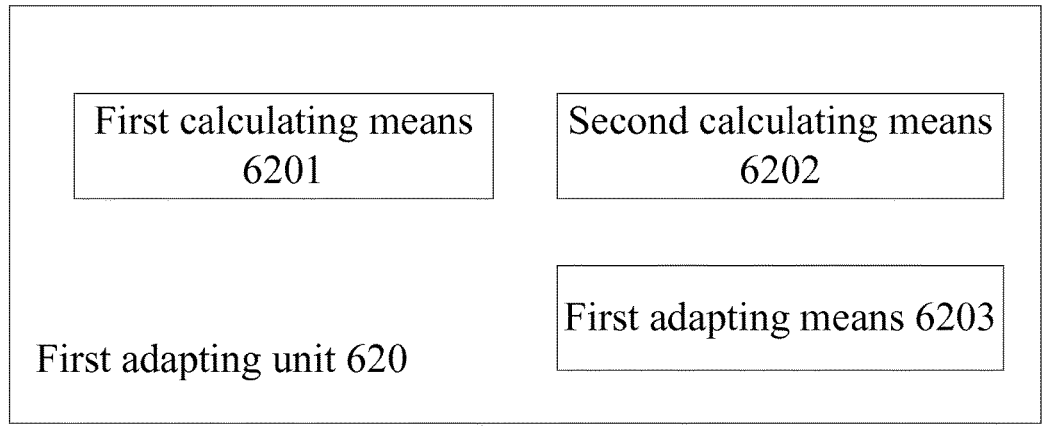
FIG. 7 schematically illustrates a block diagram of a first adapting unit in an AP configured to adapt beacon transmission in accordance with an embodiment.

Now the function of the first adapting unit 620 will be further set forth by illustrating the following embodiments with reference to FIG. 7. As shown in FIG. 7, the first adapting unit 620 may comprise a first calculating means 6201, a second calculating means 6202 and a first adapting means 6203.

In an embodiment, the first calculating means 6201 may be configured to calculate a first value to be a sum of the times each of the beacon beams in the first beacon beam set is identified to carry a beacon signal with the best reception quality within the first period, based on the first statistical information. The second calculating means 6202 may be configured to calculate a first ratio which is a ratio of the first value to a sum of times each of the beacon beams in the first beacon beam set is utilized to transmit a beacon signal within the first period. The first ratio can be expressed as $F_k$ which can be calculated by the Equation 1 described above. The first adapting means 6203 may be configured to adapt the frequency to transmit a beacon signal over each of the beacon beams in the first beacon beam set based on the first ratio. For example, if the first ratio is less than a first threshold, then the first adapting means 6203 may decrease the frequency to transmit a beacon signal over each of the beacon beams in the first beacon beam set.

In another embodiment, the first calculating means 6201 may be configured to calculate a first value to be a sum of the times each of the beacon beams in the first beacon beam set is identified to carry a beacon signal with the best reception quality within the first period in the same way as above. The second calculating means 6202 may be configured to calculate a second ratio which is a ratio of the first value to a sum of times each of all the beacon beams of the AP is identified, by any one of the communication devices within the AP's coverage, to carry a beacon signal with the best reception quality among its received beacon signals within the first period. The second ratio can be expressed as $R_k$ which can be calculated by the Equation 2 described above. The first adapting means 6203 may be configured to adapt the frequency to transmit a beacon signal over each of the beacon beams in the first beacon beam set based on the second ratio. For example, if the second ratio is less than a second threshold, then the first adapting means 6203 may decrease the frequency to transmit a beacon signal over each of the beacon beams in the first beacon beam set.

Figure 8:
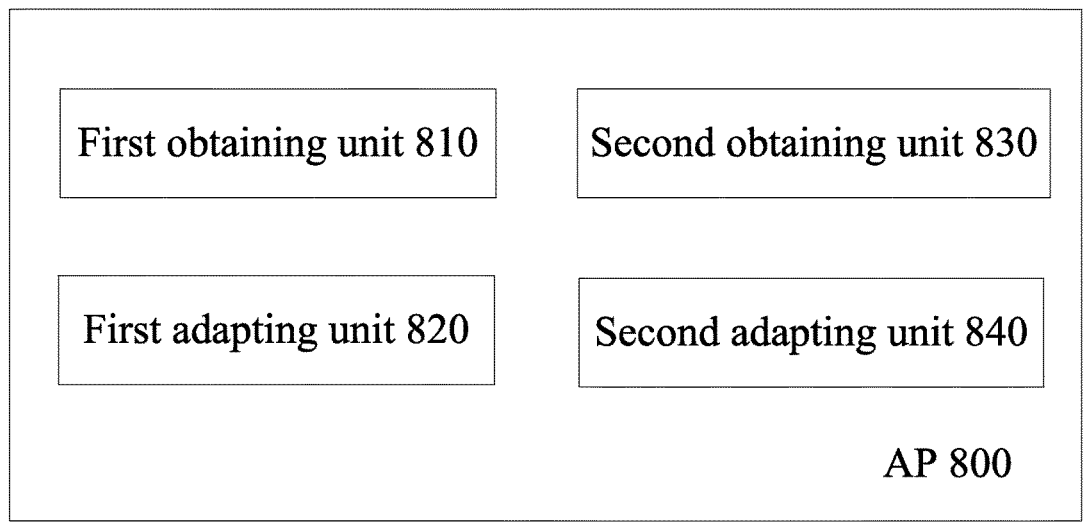
FIG. 8 schematically illustrates a block diagram of an AP configured to adapt beacon transmission in accordance with an embodiment.

FIG. 8 schematically illustrates a block diagram of an AP configured to adapt beacon transmission in accordance with an embodiment. As shown, the AP 800 comprises a first obtaining unit 810, a first adapting unit 820, a second obtaining unit 830 and a second adapting unit 840.

The first obtaining unit 810 of the AP 800 is configured to obtain a first statistical information, within a first period, on times each of beacon beams in a first beacon beam set is identified as the best beacon beam. The first adapting unit 820 of the AP 800 is configured to adapt frequency to transmit a beacon signal over each of the beacon beams in the first beacon beam set based on the first statistical information. Here, the first obtaining unit 810 and the first adapting unit 820 may function in the similar way as the first obtaining unit 610 and the first adapting unit 620 in FIG. 6.

The second obtaining unit 830 of the AP 800 may be configured to obtain a second statistical information, within a second period, on times each of the beacon beams in the first beacon beam set is identified as the best beacon beam. The second adapting unit 840 of the AP 800 may be configured to adapt the frequency to transmit a beacon signal over each of the beacon beams in the first beacon beam set based on the second statistical information.

As described above, in an example, the process executed by the first obtaining unit 810 and the first adapting unit 820 can be utilized to decrease the frequency for beacon transmission, and the process executed by the second obtaining unit 830 and the second adapting unit 840 can be utilized to decrease the frequency for beacon transmission. In this particular example, the first period may be longer than the second period. As such, the process of decreasing frequency for beacon transmission will experience a longer statistical period than the process of increasing beacon transmission. In this way, the AP will be given more opportunities to increase the frequency with respect to a beacon beam than decrease the frequency. In other words, the process of increasing the frequency for beacon transmission may make quicker response to the hotness in the coverage of the AP. For example, when additional communication devices move into or are activated in an area, the process of increasing the frequency for beacon transmission will timely increase the frequency to transmit beacon signals over the beacon beam set directed to this area. Therefore, the communication devices can access the AP more quickly.

In an embodiment, the first adapting unit 820 may calculate a first value to be a sum of the times each of the beacon beams in the first beacon beam set is identified as the best beacon beam based on the first statistical information within the first period and then calculate a first ratio which is a ratio of the first value to a sum of times each of the beacon beams in the first beacon beam set is utilized to transmit a beacon signal within the first period. The first ratio can be calculated by the equation 1 described above and may be used to adapt the frequency for beacon transmission. For example, if the first ratio is less than the first threshold, the first adapting unit 820 can decrease the frequency to transmit beacon signals over each of the beacon beams in the first beacon beam set.

Figure 9:
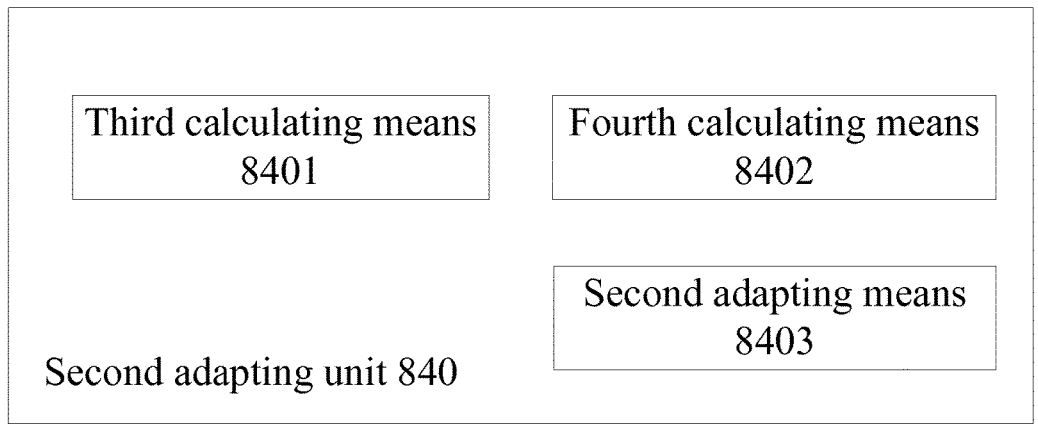
FIG. 9 schematically illustrates a block diagram of a second adapting unit in an AP configured to adapt beacon transmission in accordance with an embodiment.

The second adapting unit 840 may comprise a third calculating means 8401, a fourth calculating means 8402 and a second adapting means 8403 as illustrated in FIG. 9. The third calculating means 8401 may be configured to calculate a second value to be a sum of the times each of the beacon beams in the first beacon beam set is identified as the best beacon beam based on the second statistical information within the second period. The fourth calculating means 8402 may be configured to calculate a third ratio which is a ratio of the second value to a sum of times each of the beacon beams in the first beacon beam set is utilized to transmit a beacon signal within the second period. The third ratio can be calculated by the equation 1 described above and used to adapt the frequency for beacon transmission. For example, if the third ratio is greater than a third threshold, the second adapting means 8403 may be configured to increase the frequency to transmit beacon signals over each of the beacon beams in the first beacon beam set.

Here, in order that the frequency for beacon transmission can be more easily to be increased than decreased to minimize the negative impact on the user experience, the first threshold is set larger than the third threshold.

In another embodiment, the first adapting unit 820 may be configured to calculate a first value to be a sum of the times each of the beacon beams in the first beacon beam set is identified as the best beacon beam based on the first statistical information within the first period and then calculate a second ratio which is a ratio of the first value to a sum of times each of all the beacon beams of the AP is identified, by any one of the communication devices within the AP's coverage, as the best beacon beam within the first period. The second ratio can be calculated by the equation 2 described above and used to adapt the frequency for beacon transmission. For example, if the second ratio is less than the second threshold, the first adapting unit 820 can decrease the frequency to transmit beacon signals over each of the beacon beams in the first beacon beam set Further, the third calculating means 8401 of the second adapting unit 840 may be configured to calculate a second value to be a sum of the times each of the beacon beams in the first beacon beam set is identified as the best beacon beam based on the second statistical information within the second period. The fourth calculating means 8402 of the second adapting unit 840 may be configured to calculate a fourth ratio which is a ratio of the second value to a sum of times each of all the beacon beams of the AP is identified, by any one of the communication devices within the AP's coverage, as the best beacon beam within the second period. The fourth ratio can be calculated by the equation 2 described above and used to adapt the frequency for beacon transmission. For example, if the fourth ratio is greater than a fourth threshold, the second adapting means 8403 of the second adapting unit 840 may be configured to increase the frequency to transmit beacon signals over each of the beacon beams in the first beacon beam set.

Here, in order that the frequency for beacon transmission can be more easily to be increased than decreased to minimize the negative impact on the user experience, the second threshold is set larger than the fourth threshold.

Figure 10:
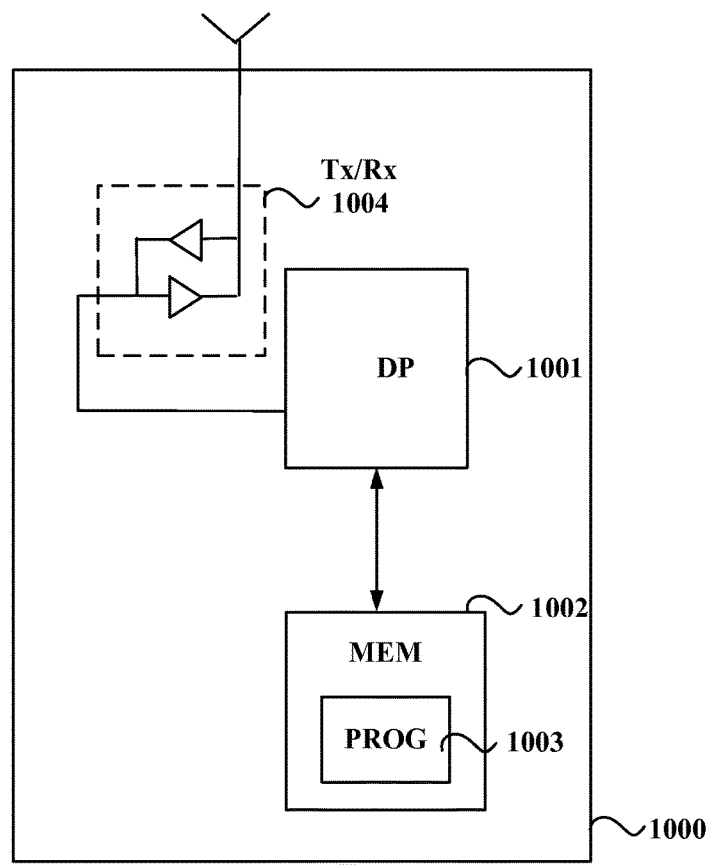
FIG. 10 illustrates a simplified block diagram of an AP that is suitable for use in practicing exemplary embodiments of the present disclosure.

FIG. 10 illustrates a simplified block diagram of an AP 1000 that is suitable for use in practicing exemplary embodiments of the present disclosure.

As shown in FIG. 10, the AP 1000 includes a data processor (DP) 1001, a memory (MEM) 1002 coupled to the DP 1001, and a suitable radio frequency transmitter TX and receiver RX 1004 coupled to the DP 1001. The MEM 1002 stores a program (PROG) 1003. The TX/RX 1004 is for bidirectional wireless communications. Note that the TX/RX 1004 has at least one antenna (e.g. beamforming antenna) to facilitate communication. The AP 1000 may be coupled via a data path to one or more external networks or systems, such as the internet, for example.

The PROG 1003 is assumed to include program instructions that, when executed by the associated DP 1001, enable the AP 1000 to operate in accordance with the exemplary embodiments of this disclosure, as discussed herein with the methods in FIGS. 3-4. The embodiments of the present disclosure may be implemented by computer software executable by the DP 1001 of the apparatus 1000, or by hardware, or by a combination of software and hardware.

The MEM 1002 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 1000, there may be several physically distinct memory units in the apparatus 1000. The DP 1001 may be of any type suitable to the local technical environment, and may include one or more of general purpose computers, special purpose computers, microprocessors, digital signal processors (DSPs) and processors based on multi-core processor architecture, as non limiting examples. The AP 1000 may have multiple processors, such as for example an application specific integrated circuit chip that is slaved in time to a clock which synchronizes the main processor.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method in an access point (AP) for adaptive beacon transmission, the AP transmitting a beacon signal through a plurality of beacon beams in an area served by the AP, the plurality of beacon beams being grouped into a plurality of beacon beam sets, the method comprising:

obtaining a first statistical information, within a first period, based on times when each of the plurality of beacon beams in a first beacon beam set is identified, by any one of at least one communication device within the area, to carry the beacon signal with a best reception quality, wherein each of the plurality of beacon beams is identified to carry the beacon signal with the best reception quality based on a comparison of reception qualities measured at the communication device, and wherein each one of the reception qualities is determined based upon at least one of a strength, Signal to Interference and Noise Ratio (SINR) and the Signal to Noise Ratio (SNR) of the beacon signal when received at the communication device from the AP through a beacon beam from the plurality of beacon beams; and adapting a frequency to transmit the beacon signal over each of the plurality of beacon beams in the first beacon beam set based on the first statistical information, wherein the adapting includes:

based on the first statistical information, calculating a first value to be a sum of times when each of the plurality of beacon beams in the first beacon beam set is identified to carry the beacon signal with the best reception quality within the first period;

calculating a first ratio or a second ratio, wherein the first ratio is a ratio of the first value to the sum of times when each of the plurality of beacon beams in the first beacon beam set is utilized to transmit the beacon signal within the first period, and the second ratio is the ratio of the first value to the sum of times when each of the plurality of beacon beams is identified, by any one of the at least one communication device, to carry the beacon signal with the best reception quality among received beacon signals within the first period, and adapting the frequency to transmit the beacon signal over each of the plurality of beacon beams in the first beacon beam set based on the first ratio or the second ratio.

2. The method of claim 1, wherein the adapting the frequency based on the first ratio or the second ratio comprises decreasing the frequency to transmit the beacon signal over each of the plurality of beacon beams in the first beacon beam set if the first ratio is less than a first threshold or the second ratio is less than a second threshold.

3. The method of claim 2, wherein the adapting the frequency based on a second statistical information comprises:

based on the second statistical information, calculating a second value to be a sum of times when each of the plurality of beacon beams in the first beacon beam set is identified to carry the beacon signal with the best reception quality within the second period;

calculating a third ratio or a fourth ratio, wherein the third ratio is a ratio of the second value to the sum of times when each of the plurality of beacon beams in the first beacon beam set is utilized to transmit the beacon signal within the second period, and the fourth ratio is the ratio of the second value to the sum of times when each of the plurality of beacon beams is identified, by any one of the at least one communication device, to carry the beacon signal with the best reception quality among received beacon signals within the second period; and increasing the frequency to transmit the beacon signal over each of the plurality of beacon beams in the first beacon beam set if the third ratio is greater than a third threshold or the fourth ratio is greater than a fourth threshold.

4. The method of claim 3, wherein the first threshold is greater than the third threshold and the second threshold is greater than the fourth threshold.

5. The method of claim 1, wherein the method further comprises:

obtaining a second statistical information, within a second period, based on times when each of the plurality of beacon beams in the first beacon beam set is identified, by any one of the at least one communication device, to carry the beacon signal with a best reception quality, wherein each of the plurality of beacon beams is identified to carry the beacon signal with the best reception quality based on a comparison of reception qualities measured at the communication device, and wherein each one of the reception qualities is of the beacon signal when received at the communication device from the AP through a beacon beam from the plurality of beacon beams; and adapting the frequency to transmit the beacon signal over each of the plurality of beacon beams in the first beacon beam set based on the second statistical information.

6. The method of claim 5, wherein the first period is longer than the second period.

7. The method of claim 1, wherein each of the plurality of beacon beam sets has one beacon beam.

8. A non-transitory computer readable storage medium which stores instructions which, when run on a processor of an access point (AP), the AP transmitting a beacon signal through a plurality of beacon beams in an area served by the AP, the plurality of beacon beams being grouped into a plurality of beacon beam sets, cause the AP to perform operations comprising:

obtaining a first statistical information, within a first period, based on times when each of the plurality of beacon beams in a first beacon beam set is identified, by any one of at least one communication device within the area, to carry a beacon signal with a best reception quality, wherein each of the plurality of beacon beams is identified to carry the beacon signal with the best reception quality based on a comparison of reception qualities measured at the communication device, and wherein each one of the reception qualities is determined based upon at least one of a strength, Signal to Interference and Noise Ratio (SINR) and the Signal to Noise Ratio (SNR) of the beacon signal when received at the communication device from the AP through a beacon beam from the plurality of beacon beams; and adapting a frequency to transmit the beacon signal over each of the plurality of beacon beams in the first beacon beam set based on the first statistical information, wherein the adapting includes:

based on the first statistical information, calculating a first value to be a sum of times when each of the plurality of beacon beams in the first beacon beam set is identified to carry the beacon signal with the best reception quality within the first period, calculating a first ratio or a second ratio, wherein the first ratio is a ratio of the first value to the sum of times when each of the plurality of beacon beams in the first beacon beam set is utilized to transmit the beacon signal within the first period, and the second ratio is the ratio of the first value to the sum of times when each of the plurality of beacon beams is identified, by any one of the at least one communication device, to carry the beacon signal with the best reception quality among received beacon signals within the first period, and adapting the frequency to transmit the beacon signal over each of the plurality of beacon beams in the first beacon beam set based on the first ratio or the second ratio.

9. An access point (AP) configured to adapt beacon transmission, the AP being configured to transmit a beacon signal through a plurality of beacon beams in an area served by the AP, the plurality of beacon beams being grouped into a plurality of beacon beam sets, the AP comprising:

a processor and a memory, said memory containing instructions which when executed by said processor perform operations including:

obtaining a first statistical information, within a first period, based on times when each of the plurality of beacon beams in a first beacon beam set is identified, by any one of at least one communication device within the area, to carry the beacon signal with a best reception quality, wherein each of the plurality of beacon beams is identified to carry the beacon signal with the best reception quality based on a comparison of reception qualities measured at the communication device, and wherein each one of the reception qualities is determined based upon at least one of a strength, Signal to Interference and Noise Ratio (SINR) and the Signal to Noise Ratio (SNR) of the beacon signal when received at the communication device from the AP through a beacon beam from the plurality of beacon beams; and adapting a frequency to transmit the beacon signal over each of the plurality of beacon beams in the first beacon beam set based on the first statistical information, wherein the adapting includes:

based on the first statistical information, calculating a first value to be a sum of times when each of the plurality beacon beams in the first beacon beam set is identified to carry the beacon signal with the best reception quality within the first period;

calculating a first ratio or a second ratio, wherein the first ratio is a ratio of the first value to the sum of times when each of the plurality of beacon beams in the first beacon beam set is utilized to transmit the beacon signal within the first period, and the second ratio is the ratio of the first value to the sum of times when each of the plurality of beacon beams is identified, by any one of the at least one communication device, to carry the beacon signal with the best reception quality among received beacon signals within the first period, and adapting the frequency to transmit the beacon signal over each of the plurality of beacon beams in the first beacon beam set based on the first ratio or the second ratio.

10. The AP of claim 9, wherein said instructions further include:

decreasing the frequency to transmit the beacon signal over each of the plurality of beacon beams in the first beacon beam set if the first ratio is less than a first threshold or the second ratio is less than a second threshold.

11. The AP of claim 10, wherein said instructions further include:

obtaining a second statistical information, within a second period, based on times when each of the plurality of beacon beams in the first beacon beam set is identified, by any one of the at least one communication device, to carry the beacon signal with a best reception quality, wherein each of the plurality of beacon beams is identified to carry the beacon signal with the best reception quality based on a comparison of reception qualities measured at the communication device, and wherein each one of the reception qualities is of the beacon signal when received at the communication device from the AP through a beacon beam from the plurality of beacon beams; and adapting the frequency to transmit the beacon signal over each of the plurality of beacon beams in the first beacon beam set based on the second statistical information.

12. The AP of claim 11, wherein the first period is longer than the second period.

13. The AP of claim 11, wherein said instructions further include:

based on the second statistical information, calculating a second value to be a sum of times when each of the plurality of beacon beams in the first beacon beam set is identified to carry the beacon signal with the best reception quality within the second period;

calculating a third ratio or a fourth ratio, wherein the third ratio is a ratio of the second value to the sum of times when each of the plurality of beacon beams in the first beacon beam set is utilized to transmit the beacon signal within the second period, and the fourth ratio is the ratio of the second value to the sum of times when each of the plurality of beacon beams is identified, by any one of the at least one communication device, to carry the beacon signal with the best reception quality among received beacon signals within the second period; and increasing the frequency to transmit the beacon signal over each of the plurality of beacon beams in the first beacon beam set if the third ratio is greater than a third threshold or the fourth ratio is greater than a fourth threshold.

14. The AP of claim 13, wherein the first threshold is greater than the third threshold, and the second threshold is greater than the fourth threshold.

\* \* \* \* \*